US011679964B2

(12) United States Patent
Colson

(10) Patent No.: US 11,679,964 B2
(45) Date of Patent: Jun. 20, 2023

(54) SYSTEM, METHOD AND APPARATUS FOR SERVICING A PULVERIZER

(71) Applicant: GENERAL ELECTRIC TECHNOLOGY GMBH, Baden (CH)

(72) Inventor: Paul Mackenzie Colson, Westfield, MA (US)

(73) Assignee: General Electric Technology GmbH, Baden (CH)

( * ) Notice: Subject to any disclaimer, the term of this patent is extended or adjusted under 35 U.S.C. 154(b) by 1036 days.

(21) Appl. No.: 16/415,317

(22) Filed: May 17, 2019

(65) Prior Publication Data
US 2019/0270087 A1 Sep. 5, 2019

Related U.S. Application Data

(62) Division of application No. 15/142,062, filed on Apr. 29, 2016, now Pat. No. 10,343,173.

(51) Int. Cl.
| B66D 1/60 | (2006.01) |
| B02C 15/00 | (2006.01) |
| B02C 15/02 | (2006.01) |
| B02C 15/04 | (2006.01) |
| B23P 6/00 | (2006.01) |

(Continued)

(52) U.S. Cl.
CPC ............... *B66D 1/60* (2013.01); *B02C 15/00* (2013.01); *B02C 15/007* (2013.01); *B02C 15/02* (2013.01); *B02C 15/04* (2013.01); *B23P 6/00* (2013.01); *B66D 1/36* (2013.01); *B66D 1/02* (2013.01);

(Continued)

(58) Field of Classification Search
CPC ... B66D 1/36; B66D 1/60; B66D 3/06; B66D 3/08; B66D 3/20; B66D 3/26; B66D 2700/0125; B02C 15/00–16
See application file for complete search history.

(56) References Cited

U.S. PATENT DOCUMENTS 2,485,362 A   10/1949 Coryer
2,710,767 A   6/1955 Howe
(Continued)

FOREIGN PATENT DOCUMENTS

| DE | 4423930 A1 * | 1/1996 | ............. B02C 15/00 |
| EP | 0110535 | 6/1984 | |
| GB | 2187658 | 9/1987 | |

*Primary Examiner* — Sang K Kim
*Assistant Examiner* — Nathaniel L Adams
(74) *Attorney, Agent, or Firm* — Grogan, Tuccillo & Vanderleeden, LLP

(57) ABSTRACT

A system for servicing a pulverizer includes a pulverizer having a housing, a journal assembly pivotally connected to the housing, a grinding mechanism operatively connected to the journal assembly, and an opening within the housing adjacent to the journal assembly and providing an access point to an interior of the housing, and a hoist apparatus mounted to the housing. The hoist apparatus includes a frame assembly received about the opening in the housing, a sheave assembly including a plurality of sheaves supported by the frame assembly, a motor operatively connected to one of the plurality of sheaves, and a cable received by the sheave assembly. The motor is operable to at least one of retract the cable through the sheave assembly to rotate a component out of the pulverizer through the opening and controllably let out the cable to rotate the component into the pulverizer through the opening.

12 Claims, 10 Drawing Sheets

(51) Int. Cl.
    *B66D 1/36*    (2006.01)
    *B66D 1/02*    (2006.01)
(52) U.S. Cl.
    CPC ................ *B66D 2700/0125* (2013.01); *B66D 2700/025* (2013.01)

(56)　　　　　　　References Cited

U.S. PATENT DOCUMENTS

| | | | |
|---|---|---|---|
| 3,349,818 A | | 10/1967 | Standal |
| 3,524,606 A | * | 8/1970 | Coski ..................... B66D 1/365 |
| | | | 242/484 |
| 3,818,567 A | * | 6/1974 | Moro ...................... B02C 15/04 |
| | | | 29/281.6 |
| 3,959,897 A | | 6/1976 | May |
| 4,195,786 A | | 4/1980 | Walker |
| 4,258,886 A | | 3/1981 | Lundahl |
| 4,432,500 A | * | 2/1984 | Brundiek ............... B02C 15/04 |
| | | | 241/285.3 |
| 4,749,133 A | | 6/1988 | Sayler et al. |
| 5,054,697 A | | 10/1991 | Provost |
| 5,549,251 A | | 8/1996 | Provost |
| 7,014,172 B2 | * | 3/2006 | Kataoka ................... B66D 3/18 |
| | | | 254/338 |
| 8,820,718 B2 | * | 9/2014 | Weidner .................. B66D 1/00 |
| | | | 254/332 |
| 2016/0376133 A1 | * | 12/2016 | Terrell .................... B66D 1/36 |
| | | | 414/559 |

\* cited by examiner

SYSTEM, METHOD AND APPARATUS FOR SERVICING A PULVERIZER

CROSS REFERENCE TO RELATED APPLICATION

This application claims priority to, and is a divisional of U.S. Non-Provisional application Ser. No. 15/142,062, filed on Apr. 29, 2016 and titled "SYSTEM, METHOD AND APPARATUS FOR SERVICING A PULVERIZER," which is incorporated herein by reference in its entirety.

BACKGROUND

Technical Field

Embodiments of the invention relate to pulverized coal boilers and, more particularly, to a system, method and apparatus for servicing and/or replacing grinding assembly components of a pulverizer.

DISCUSSION OF ART

Coal fired boilers utilize pulverizers, such as, for example, bowl mill pulverizers, to grind coal to a desired fineness so that it may be used as fuel for burners. In a typical pulverized coal boiler, coal particulate and primary air flow from the pulverizers to the burners through an array of coal pipes leading from the pulverizers to the burners. Typically, raw coal is fed through a central coal inlet at the top of the pulverizer and falls by gravity to a grinding table at the base of the mill. Grinding rollers mounted on suitably supported journals interact with the grinding table to effect the grinding of material interposed therebetween. After being pulverized, the particles of material are transported upwards using air as the transport medium. Once the coal is ground finely enough, it is discharged from the pulverizer and distributed among multiple pulverized coal outlet pipes and into respective fuel conduits where it is carried to the burners.

Over time, the grinding elements of the pulverizer exhibit wear and ultimately require replacement. Replacement of the grinding elements requires that they be removed from the pulverizer. Certain pulverizers are designed so that the journal assembly and the grinding roll of the grinding assembly can be rotated out of the pulverizer housing so that replacement and/or maintenance can be performed. This design, however, requires that a large and complex crane system that runs the length of the mill bay be installed for every project.

In view of the above, there is a need for a system, method and apparatus that enables the journal assembly and grinding roll assembly to be rotated in or out of the pulverizer during replacement or servicing without the use of an overhead crane or fork lift.

BRIEF DESCRIPTION

In an embodiment a system for servicing a pulverizer is provided. The system includes a pulverizer having a housing, a journal assembly pivotally connected to the housing, a grinding mechanism operatively connected to the journal assembly, an opening within the housing adjacent to the journal assembly and providing an access point to an interior of the housing, and a plurality of holes in the housing surrounding the opening configured to receive fasteners for selectively securing a cover and a hoist apparatus to the housing, and the hoist apparatus mounted to the housing of the pulverizer. The hoist apparatus includes a frame assembly received about the opening in the housing, a sheave assembly including a plurality of sheaves supported by the frame assembly, the sheaves being mounted for rotation about respective horizontal axes, a motor operatively connected to one of the plurality of sheaves, and a cable received by the sheave assembly. The motor is operable to at least one of retract the cable through the sheave assembly to rotate a component out of the pulverizer through the opening and controllably let out the cable to rotate the component into the pulverizer through the opening.

In another embodiment, a method for servicing a pulverizer is provided. The method includes the steps of connecting a hoist apparatus to the housing of a pulverizer adjacent to a journal opening in the housing, extending a cable through the journal opening into the housing, connecting the cable to a component within the housing, actuating a motor of the hoist apparatus to rotate the sheave to withdraw the cable, and rotating the component out of the housing through the opening.

In yet another embodiment, a hoist apparatus for a pulverizer is provided. The hoist apparatus includes a frame assembly having a back plate having a plurality of apertures configured to receive fasteners for mounting the hoist apparatus to the pulverizer, a top plate extending outwardly from the back plate, and a plurality of support plates extending between the back plate and the top plate and configured to support the top plate from below, a sheave assembly including a plurality of sheaves supported by the frame assembly, the sheaves being mounted for rotation about respective horizontal axes, a motor operatively connected to one of the plurality of sheaves, and a cable received by the sheave assembly. The motor is operable to retract the cable through the sheave assembly to rotate a component out of the pulverizer.

DRAWINGS

The present invention will be better understood from reading the following description of non-limiting embodiments, with reference to the attached drawings, wherein below:

Figure 8:
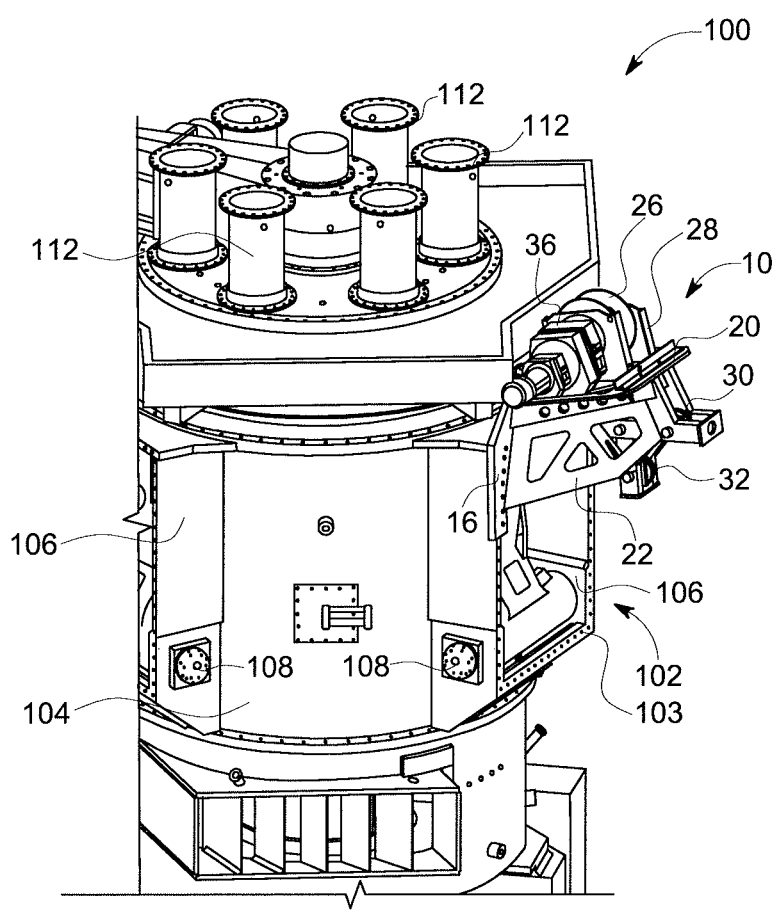

FIG. 8 another left side, perspective view of the hoist apparatus, shown with an integral motor and attached to the housing of a pulverizer.

Figure 9:
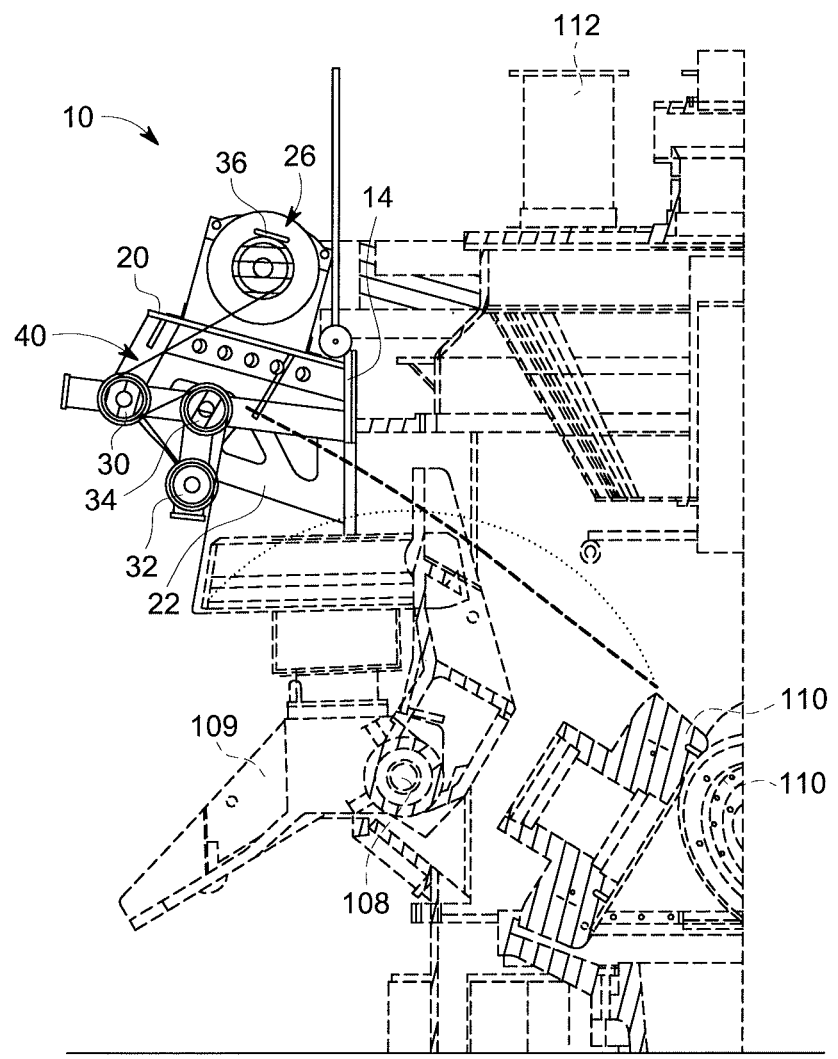

FIG. 9 is a simplified, cross-sectional illustration of the hoist apparatus, shown attached to a pulverizer.

Figure 10:
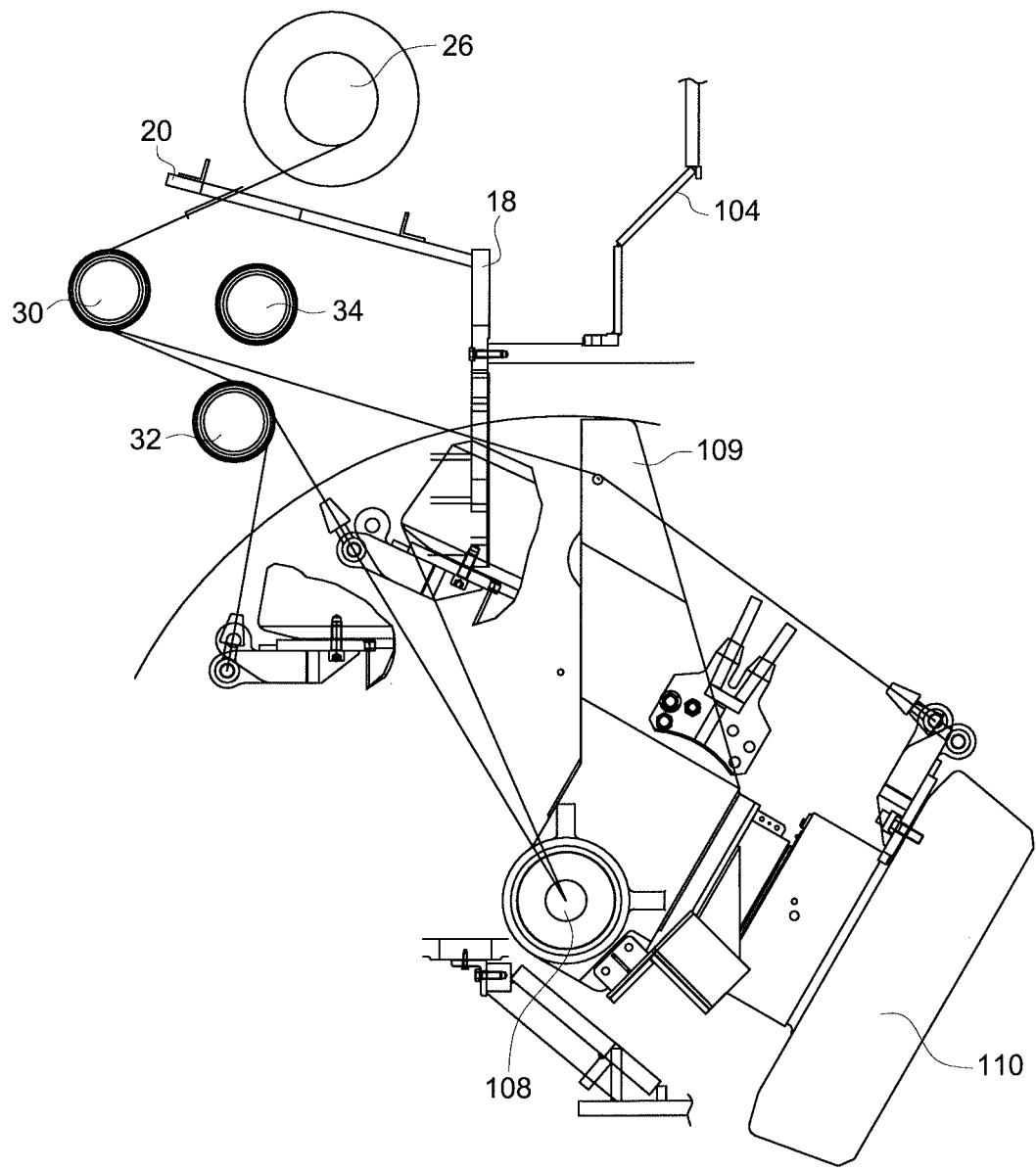

FIG. 10 a simplified, schematic illustration of the hoist apparatus, showing a tilt-out operation for removing a journal assembly and grinding assembly of the pulverizer.

Figure 11:
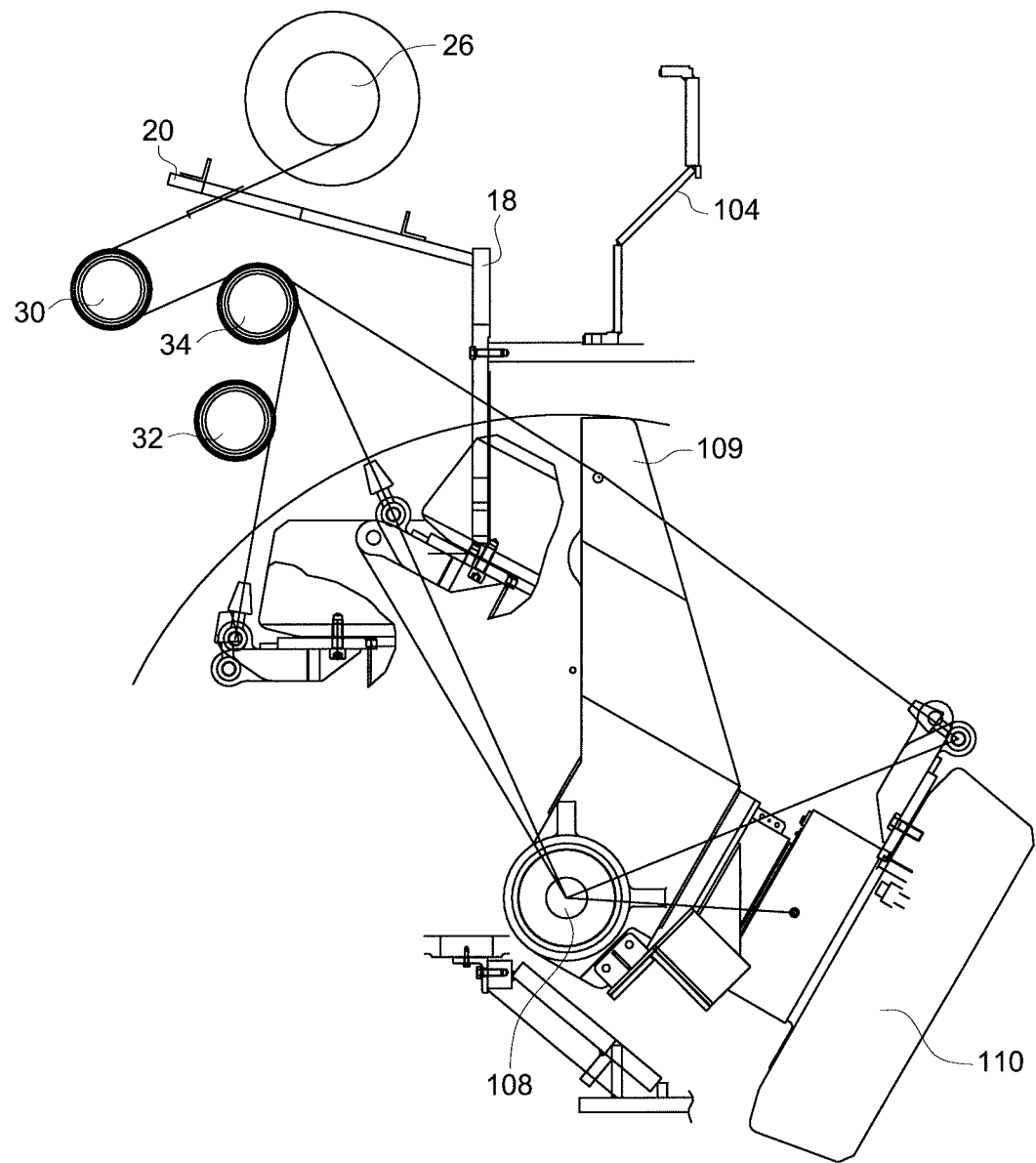

FIG. 11 a simplified, schematic illustration of the hoist apparatus, showing a tilt-in operation for installing a journal assembly and grinding assembly of the pulverizer.

DETAILED DESCRIPTION

Reference will be made below in detail to exemplary embodiments of the invention, examples of which are illustrated in the accompanying drawings. Wherever possible, the same reference characters used throughout the drawings refer to the same or like parts. While embodiments of the invention are directed to an apparatus and method for tilting or lifting a journal assembly and grinding mechanism out of the housing of a pulverizer, embodiments of the invention may also be applicable for lifting or removing other internal components of a pulverizer or grinding mill. In addition, embodiments of the invention may also be applicable for lifting items or components, more generally.

As used herein, "operatively coupled" refers to a connection, which may be direct or indirect. The connection is not necessarily being a mechanical attachment. As used herein, "mechanically coupled" refers to any coupling method capable of supporting the necessary forces for transmitting torque between components.

Figure 4:
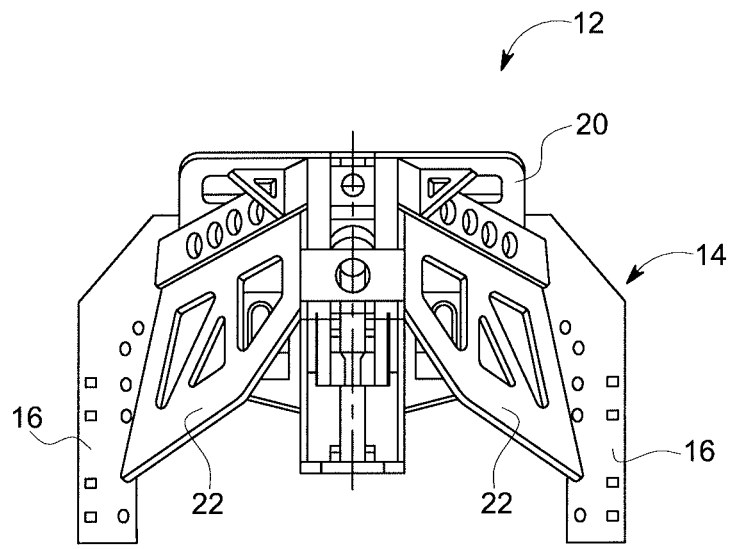
FIG. 4 is front, elevational view of the frame assembly of FIG. 3.

Embodiments of the invention relate to a hoist apparatus and method for tilting or lifting a journal assembly and grinding mechanism out of the housing of a pulverizer so that the journal assembly or grinding assembly may be repaired or replaced. With reference to FIGS. 1-4, a hoist apparatus 10 according to an embodiment of the invention includes a frame assembly 12 having a generally U-shaped back plate 14 formed from a pair of opposed, vertical leg members 16 and a cross member 18 connecting the leg members 16 at respective top ends thereof. The frame assembly 12 also includes a top plate 20 that extends outward from the cross member 18 of the back plate at an upward angle. A pair of opposed bolstering members or support plates 22 extend between the respective leg members 16 and the top plate 20 and support the top plate 20 from below. As best shown in FIG. 4, the support plates 22 angle inward from the back plate 14 to the top plate 20. In an embodiment, the back plate, top plate and supporting plates may be formed from stamped or cut plates of metal and are joined together by welding, although other joining means such as bolts or threaded fasteners may be utilized without departing from the broader aspects of the present invention. In other embodiments, one or more of these components may be a single casting.

In an embodiment, the hoist apparatus 10 may also include a ballast weight 24. The ballast weight may be welded or otherwise fastened to the back face of the back plate 14 and, in particular, to the back face of the cross member 18 of the back plate, the purpose of which will be discussed hereinafter.

Figure 1:
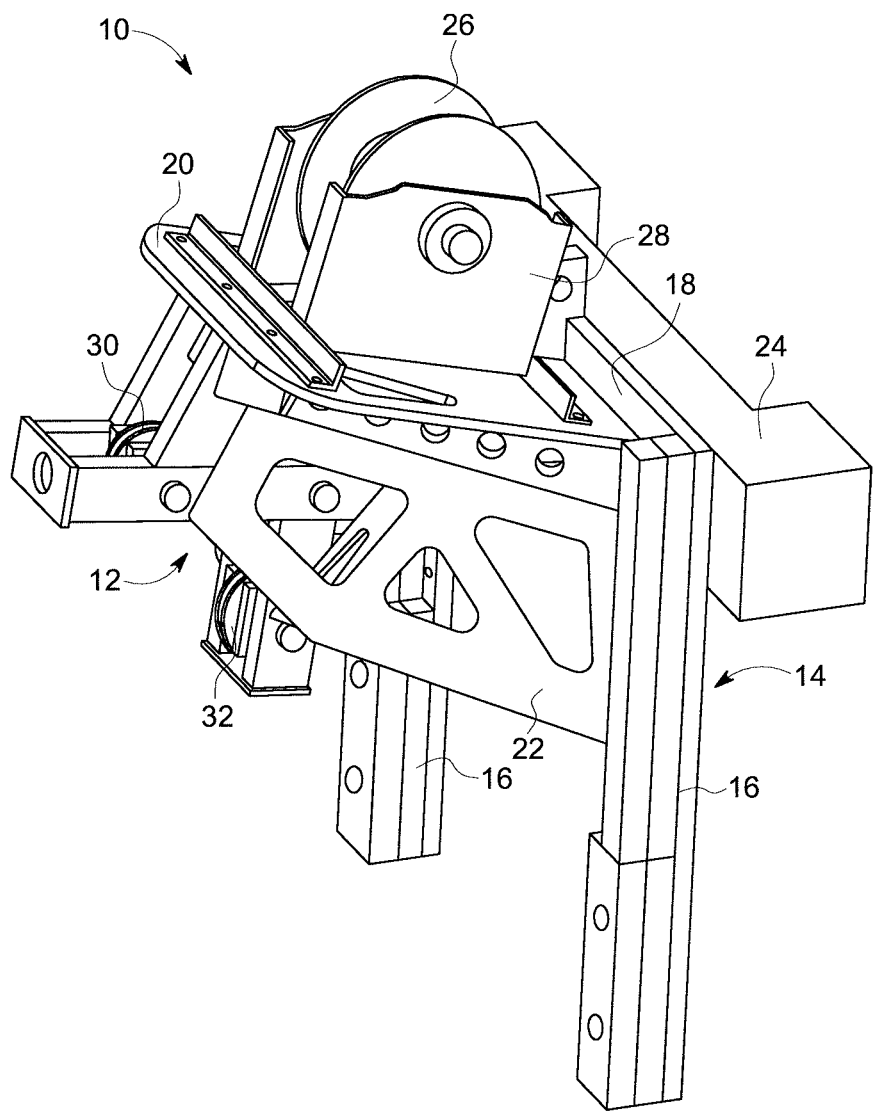
FIG. 1 is a front, perspective view of a hoist apparatus for servicing the grinding mechanism of a pulverizer, according to an embodiment of the invention.
Figure 2:
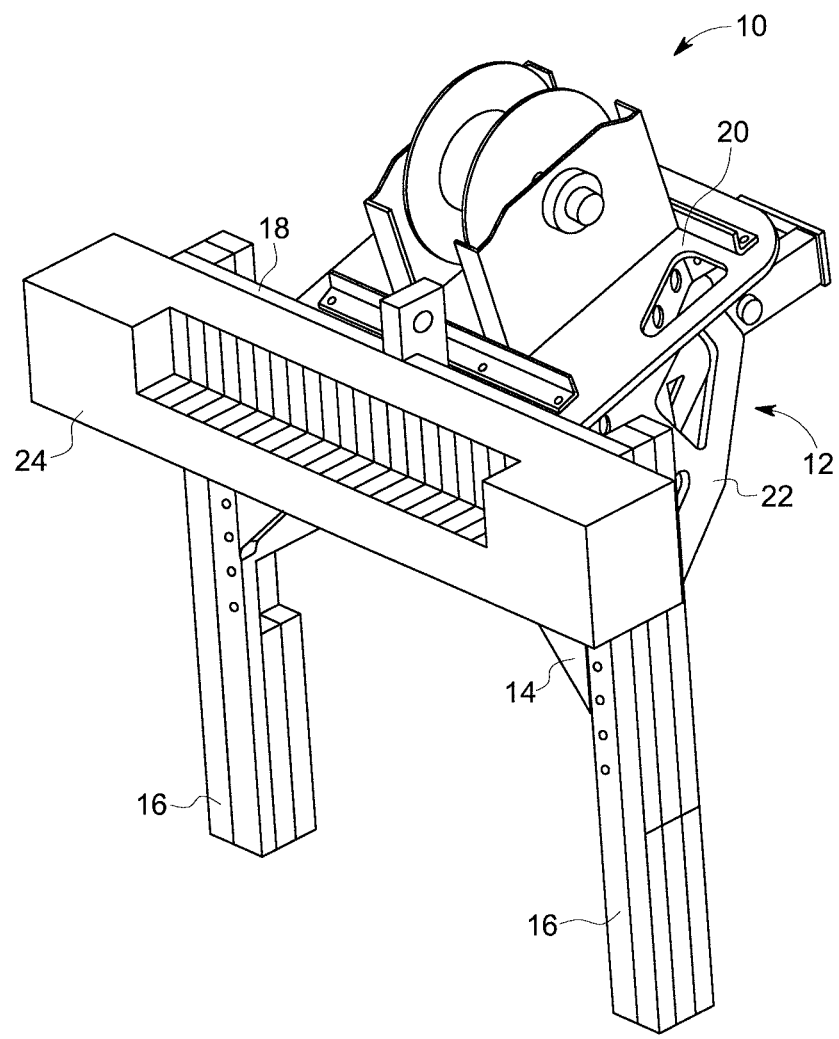
FIG. 2 is a rear, perspective view of the hoist apparatus of FIG. 1.
Figure 3:
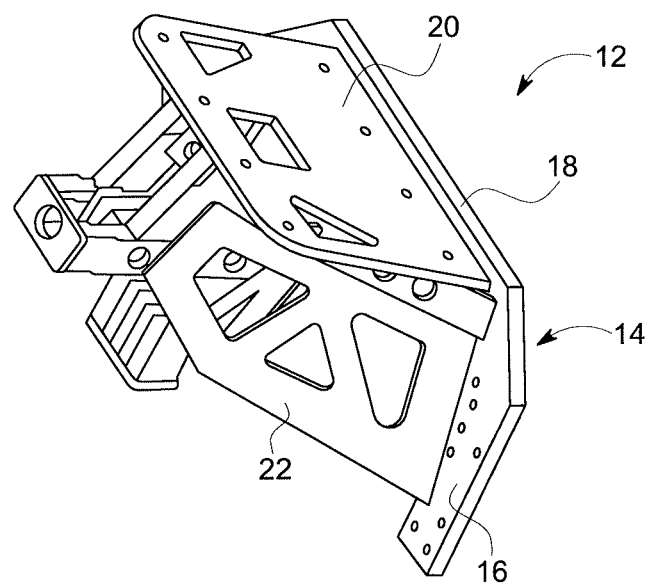
FIG. 3 is a perspective view of a frame assembly of the hoist apparatus of FIG. 1.

As shown in FIGS. 1 and 2, the hoist apparatus 10 also includes a plurality of sheaves configured to receive a wire rope or cable. For example, as shown therein, a first sheave 26 is mounted to the top plate 20 via a mounting block 28. In addition, three additional sheaves 30, 32, 34 are mounted beneath the top plate 20. Each of the sheaves 26, 30, 32, 34 are mounted for rotation about respective horizontal axes and are positioned along a center line of the frame assembly 12 when viewed from the front.

Figure 5:
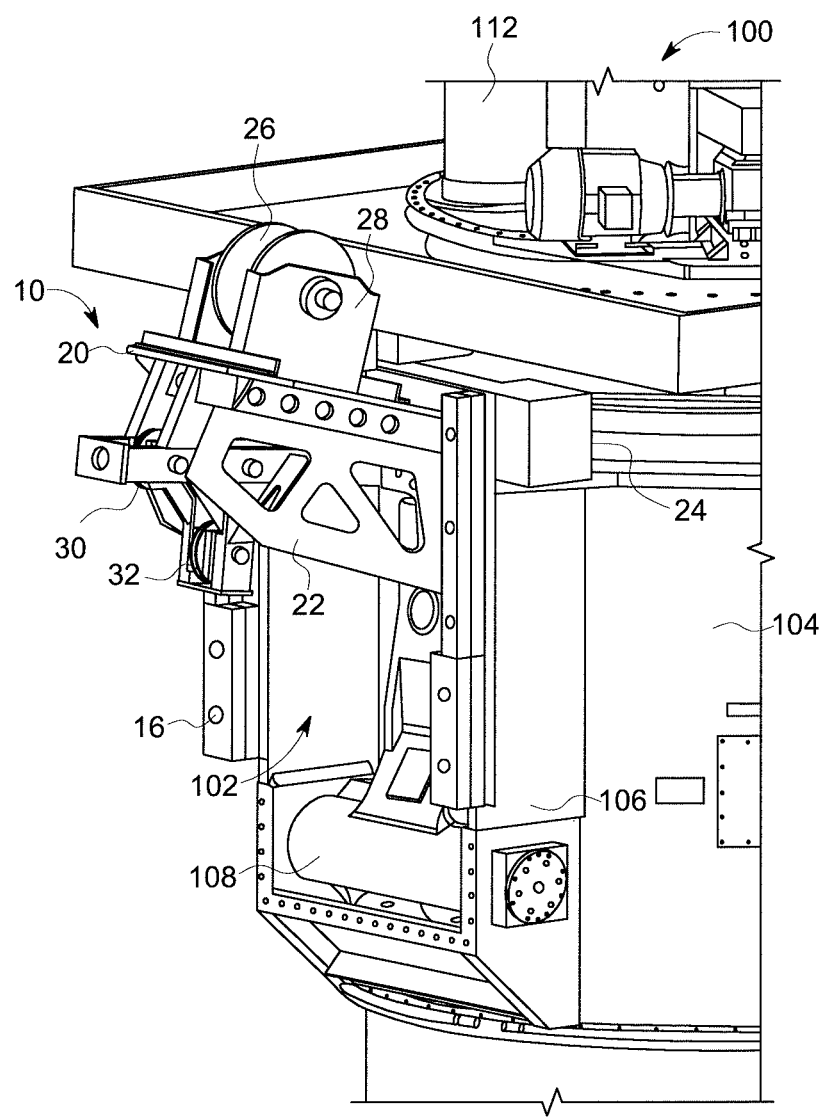
FIG. 5 is a right side, perspective view of the hoist apparatus of FIG. 1, shown installed on the housing of a pulverizer.
Figure 6:
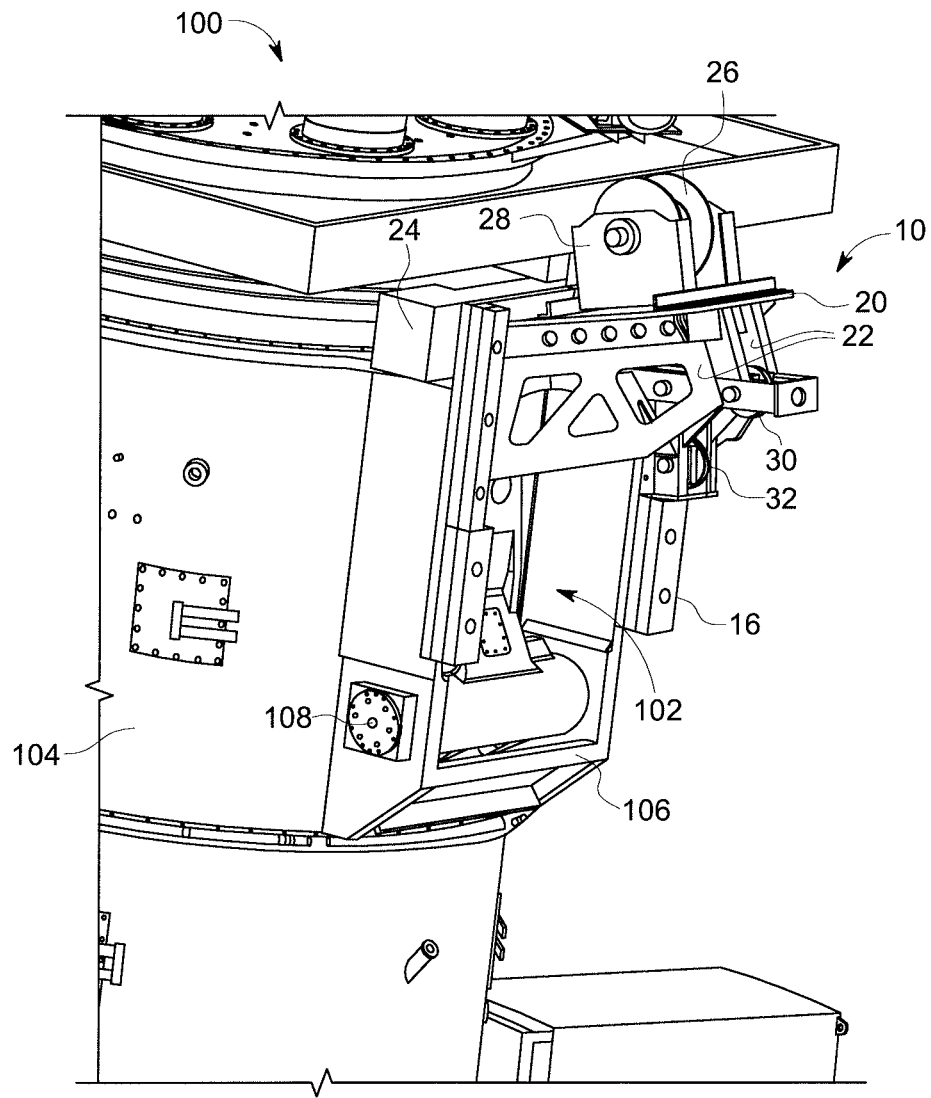
FIG. 6 is a left side, perspective view of the hoist apparatus of FIG. 1, shown installed on the housing of a pulverizer.

Turning now to FIGS. 5 and 6, the hoist apparatus 10 is shown in position with respect to the housing of a pulverizer 100. In an illustrative embodiment, the pulverizer 100 may be a vertical spindle-type pulverizer that includes a pulverizer housing 104 within which a grinding table (not shown) is situated to provide a grinding surface for a material to be pulverized. In one embodiment, the grinding table is mounted on a shaft (not shown) that in turn is operatively connected to a suitable gearbox drive mechanism (not shown) so as to be capable of being suitably driven for rotation within the pulverizer housing 104. As is known in the art, a journal assembly 109 is pivotably mounted on a pivot shaft 108 that is secured to the pulverizer housing 106. The journal assembly 109 carries a grinding roll 110 rotatably mounted thereon for grinding a material such as raw coal. As indicated above, once coal is ground to a desired degree of fineness, it is transported upward by a flow of primary air, through a classifier section, and exits the pulverizer 100 through a plurality of coal outlet pipes 112. While a vertical spindle type pulverizer is shown and described herein, the apparatus 10 of the invention may also be used with other types of pulverizers without departing from the broader aspects of the present invention.

As shown in FIGS. 5 and 6, the frame assembly 12 of the apparatus 10 is dimensioned to correspond to the size of a journal opening 102 in the housing 104 of the pulverizer. As illustrated therein, the ballast weight 24 of the apparatus 10 is configured to rest atop the frame 106 which defines the journal opening 102. Once positioned around the opening 102, the hoist apparatus 10 may be secured to the front face of the frame by bolts or other fasteners. In this position, the sheaves 26, 30, 32, 34 are centered with respect to the journal opening 102. In an embodiment, the apparatus 10 may be secured to the pulverizer 100 about the journal opening 102 via the existing journal opening cover bolt holes 103. This eliminates any need to modify or alter the pulverizer itself to accommodate the hoist apparatus 10. In connection with this, the frame of the journal opening 102 may include one or more bolts or pins (e.g., bolts installed in one or more of the existing journal opening cover holes) that serve as guides or aligning features for lining up the holes in the frame of the hoist apparatus 10 to the bolt holes in the housing 104 of the pulverizer 100.

Figure 7:
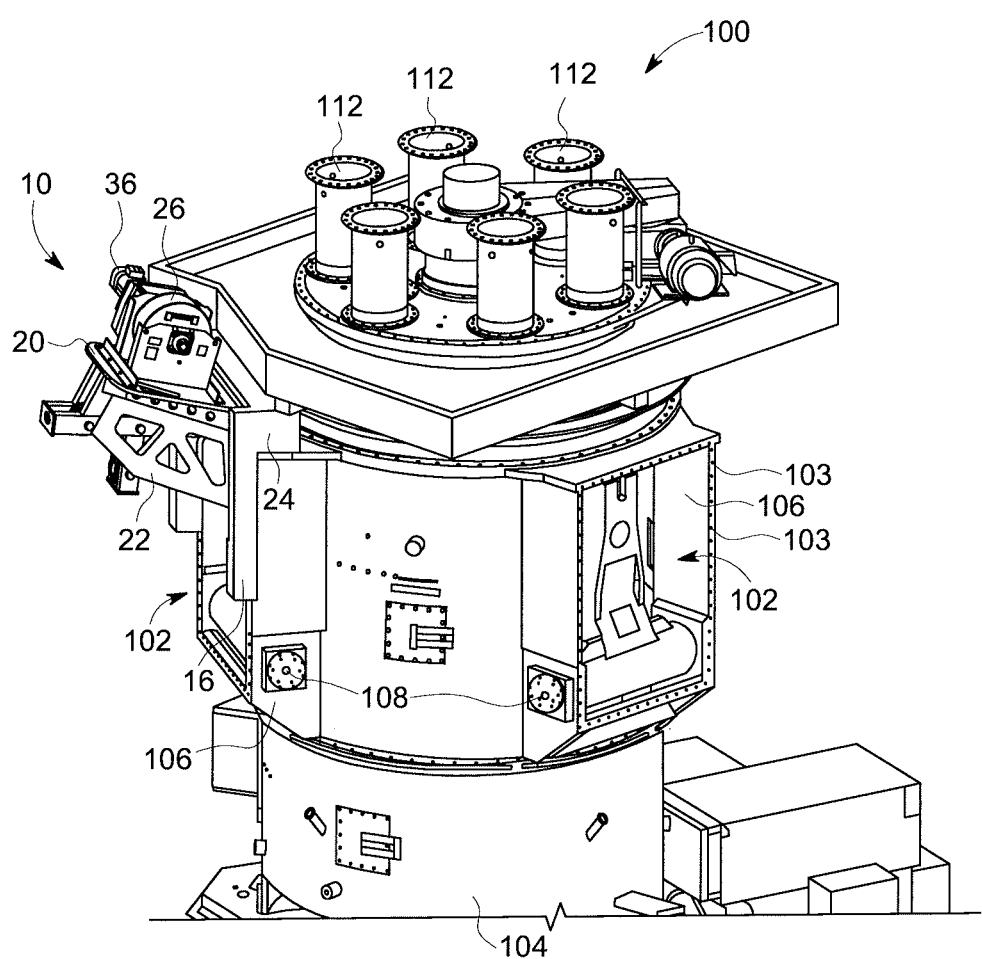
FIG. 7 is another right side, perspective view of the hoist apparatus, shown with an integral motor and attached to the housing of a pulverizer.

With reference to FIGS. 7 and 8, in an embodiment, the hoist apparatus 10 includes a motor 36 having a rotating output shaft connected to the sheave 26. For example, the motor 36 may be mounted and supported by one or more of the mounting block 28 of the sheave 26 and/or the top plate 20 of the frame assembly 12. The motor 36 is configured to rotate the sheave 26 to effect winding of the wire rope 40, as discussed in detail hereinafter. In particular, with reference to FIGS. 9-11, when it is desired to service or replace any part of the journal assembly 109 or grinding mechanism (e.g., a grinding roll 110), the journal opening 102 is first accessed by removing a door or panel. The hoist apparatus 10 may then be mounted to the frame 106 of the opening 102 in the manner hereinbefore described. The wire rope 40 is then attached to a point on the journal assembly 109 or grinding mechanism. Actuation of the motor 36 reels in the wire rope 40, causing the journal assembly 109 and grinding mechanism to rotate out of the housing 106 through the journal opening 102. In this position, as illustrated in FIGS. 10 and 11, the journal assembly 109 and the grinding mechanism are accessible so that service, maintenance or replacement operations may be performed. Once complete, the motor 36 may be utilized to slowly rotate the journal assembly 109 and grinding mechanism back into place within the housing 106. In an embodiment, the motor 36 may be a hydraulic motor or an electric motor.

Due to the relatively small size and weight of the hoist apparatus 10, the apparatus 10 may be moved from journal opening to journal opening, or from pulverizer to pulverizer, quickly and easily whenever maintenance or replacement of the journal assembly, grinding mechanism or other components of a pulverizer is necessary. In an embodiment, the weight of the apparatus 10 is between about 1,000 pounds to about 30,000. In an embodiment, the weight of the apparatus 10 is between about 6,000 pounds and 25,000 pounds depending on the materials used and the size of the pulverizer with which the apparatus is intended to be utilized.

The apparatus 10 is also compact, allowing it to be utilized in situations even where there is limited space around the pulverizer due to piping and platforms. In particular, as best illustrated in FIG. 9, the top of the apparatus 10 does not extend substantially above a top surface of a turret, also referred to as the mill outlet area, of the pulverizer 100 (i.e., the top of the surface of the apparatus 10 extends roughly to, or below, a height equal to where the coal outlet pipes 112 are joined to the turret). The sheaves 26, 30, 32, 34 are also designed and so located so as to minimize the total height of the apparatus 10. This low-profile configuration helps to minimize weight as well as reduce the likelihood of interference with anything above the apparatus (such as maintenance platforms on certain pulverizers). Moreover, the sheaves area arranged to allow the cable 40 to clear the top of the journal opening 102 during tilt out and tilt in, and to keep the angle of the cable 40 as wide as possible to minimize the load on the sheaves, shafts and frame. The location of the motor 36 (and sheave 26) is based on a minimum fleet distance, the angle of the cable 40 on the leading sheave, and the desire to keep the height of the apparatus 10 as low as possible. In an embodiment, it is also desirable from a structural standpoint that the motor 36 and leading sheave is located close to the body of the pulverizer 100.

In addition to the above, the apparatus 10 is configured such that it may be utilized with existing pulverizers without modification to the pulverizer or its surroundings. As best shown in FIG. 9, the reeving arrangement is arranged in such a way as to locate the journal center of gravity in a precise location as the journal is tilted out. This location is set so that the center of gravity is within a specified distance of the pivot center point when the wire rope 40 is at its shortest length. This allows the wire rope or cable 40 to be slowly released and journal slowly set down in its resting position. In an embodiment, the sheaves 26, 30, 32, 34 are arranged in such a manner so that when the journal is tilted in or out, the center of gravity is located approximately 1-2" beyond a horizontal plane defined by the journal pivot center when the cable 40 is at its shortest length. For example, when the journal is being tilted out and the cable 40 is at its shortest length, the center of gravity of the journal is 1-2" outside of the journal pivot, allowing the direction of the hoist to be simply reversed and the journal lowered. When the journal is tilted in, the opposite of the above would be true. This configuration functions to minimize any accelerations or falls of the journal during tilt out. In an embodiment, the linear distance between the axis of rotation of sheave 26 and the axis of rotation of sheave 30 is approximately 49.42 inches. In an embodiment, the sheave tread diameter for sheaves 30, 32, 34 is approximately 10.62 inches. In an embodiment, the dimensions and ratios of apparatus height, width, sheave location and the like are based on a bowl diameter of the pulverizer 100. The embodiments of the apparatus 10 described herein are based on a 120 inch bowl.

As discussed above, in an embodiment, the hoist apparatus 10 includes a ballast weight 24 that serves to locate the center of gravity of the apparatus 10 in a location where a crane, forklift or other device can lift the apparatus 10 into position surrounding the journal opening 102 without requiring additional rigging or the like. In other embodiments, the hoist assembly 10 may be integrated into a height-adjustable casters to allow the apparatus 10 to be rolled into place without the use of other machinery.

As indicated above, the hoist apparatus 10, in contrast to existing systems and methods, does not require modification to the mill its surroundings and can be easily retrofit onto existing mills. In addition, no additional support equipment such as cranes or forklifts is typically necessary to install the apparatus 10. In contrast to existing methods, the hoist apparatus 10 of the invention can be manufactured at a low cost, due to a limited number of components required. Moreover, because of a limited number of moving parts, required maintenance of the apparatus 10 may be negligible. The apparatus 10 may also allow for a reduced amount of man hours required to remove or service pulverizer components such as a journal assembly or grinding mechanism as compared to existing systems and methods.

In an embodiment a system for servicing a pulverizer is provided. The system includes a pulverizer having a housing, a journal assembly pivotally connected to the housing, a grinding mechanism operatively connected to the journal assembly, and an opening within the housing adjacent to the journal assembly and providing an access point to an interior of the housing, and a hoist apparatus mounted to the housing of the pulverizer. The hoist apparatus includes a frame assembly received about the opening in the housing, a sheave assembly including a plurality of sheaves supported by the frame assembly, the sheaves being mounted for rotation about respective horizontal axes, a motor operatively connected to one of the plurality of sheaves, and a cable received by the sheave assembly. The motor is operable to at least one of retract the cable through the sheave assembly to rotate a component out of the pulverizer through the opening and controllably let out the cable to rotate the component into the pulverizer through the opening. In an embodiment, the hoist apparatus is secured to the housing of the pulverizer using cover bolt holes in the housing that surround the opening. In an embodiment, the pulverizer includes a turret, and the hoist apparatus is located substantially below a plane defined by a top surface of the turret. In an embodiment, the hoist apparatus weighs between about 1,000 pounds and 30,000 pounds. In an embodiment, the component is the grinding mechanism. In an embodiment, the component is the journal assembly. In an embodiment, the plurality of sheaves are located such that a center of gravity of the journal assembly is about 0 inches to about 6 inches outside of a pivot point of the journal assembly when the journal assembly is rotated out of the opening and the cable is at its shortest length. In other embodiments, the plurality of sheaves are located such that a center of gravity of the journal assembly is about 0 inches to about 6 inches outside of the pivot point of the journal assembly when the journal assembly is rotated out of the opening and the cable is at its shortest length. In an embodiment, the sheaves are located so that the cable does not contact a top of the opening during retraction or letting out of the cable.

In another embodiment, a method for servicing a pulverizer is provided. The method includes the steps of connecting a hoist apparatus to the housing of a pulverizer adjacent to a journal opening in the housing, extending a cable through the journal opening into the housing, connecting the cable to a component within the housing, and actuating a motor of the hoist apparatus to withdraw the cable and rotate the component out of the housing through the opening. In an embodiment, the method may also include the step of removing a cover to expose the journal opening, wherein the hoist apparatus is connected to the housing using bolt holes surrounding the journal opening that are utilized to secure the cover over the journal opening. In an embodiment, the component is a journal assembly. In an embodiment, the component is a grinding mechanism. In an embodiment, the pulverizer includes a turret, wherein when mounted to the housing, the hoist apparatus is located substantially below a plane defined by a top surface of the turret. In an embodiment, the hoist apparatus weighs between about 1,000 pounds and 30,000 pounds. In an embodiment, the hoist apparatus includes a plurality of sheaves that receive the cable, the plurality of sheaves being located such that a center of gravity of the journal assembly is approximately 0 inches to 6 inches outside of a pivot point of the journal assembly when the journal assembly is rotated out of the opening and the cable is at its shortest length.

In yet another embodiment, a hoist apparatus for a pulverizer is provided. The hoist apparatus includes a frame assembly having a back plate, a top plate extending outwardly from the back plate, and a plurality of support plates extending between the back plate and the top plate and configured to support the top plate from below, a sheave assembly including a plurality of sheaves supported by the frame assembly, the sheaves being mounted for rotation about respective horizontal axes, a motor operatively connected to one of the plurality of sheaves, and a cable received by the sheave assembly. The motor is operable to retract the cable through the sheave assembly to rotate a component out of the pulverizer. In an embodiment, the hoist apparatus may further include a ballast connected to the back plate. In an embodiment, the sheave to which the motor is connected is supported by the top plate. In an embodiment, the top plate extends outward from the back plate at an upward angle. In an embodiment, the component is one of journal assembly and a grinding roll of the pulverizer.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A hoist apparatus for servicing a pulverizer having a housing, a journal assembly pivotally connected to the housing, a grinding mechanism operatively connected to the journal assembly, a journal opening within the housing adjacent to the journal assembly that provides an access point to an interior of the housing, and a plurality of holes in the housing surrounding the opening, the hoist apparatus comprising:

a frame assembly received about the journal opening within the housing of the pulverizer, the frame assembly including a back plate with a plurality of apertures configured to receive fasteners for mounting the frame assembly to the plurality of holes in the housing of the pulverizer, formed from a pair of spaced apart, opposed leg members, and a cross member extending between the leg members to connect a top end of each of the leg members with one another to provide the frame assembly with dimensions that correspond to a size of the journal opening within the housing of the pulverizer, a top plate extending outwardly from the cross member of the back plate away from the housing of the pulverizer, and a plurality of support plates coupled to the back plate and the top plate, each of the support plates extending between the back plate and the top plate at a downward angle between the leg members to support the top plate from below;

a sheave assembly including a plurality of sheaves supported by the frame assembly, the sheaves being mounted for rotation about respective horizontal axes;

a motor operatively connected to one of the plurality of sheaves; and a cable received by the sheave assembly;

wherein the motor is operable to at least one of retract the cable through the sheave assembly to rotate a component out of the pulverizer and controllably let out the cable to rotate the component into the pulverizer.

2. The hoist apparatus of claim 1, further comprising:
a ballast connected to the back plate.

3. The hoist apparatus of claim 1, wherein:
the sheave to which the motor is connected is supported by the top plate.

4. The hoist apparatus of claim 1, wherein:
the top plate extends outward from the back plate at an upward angle.

5. The hoist apparatus of claim 1, wherein:
the component is one of the journal assembly and the grinding mechanism.

6. A method for servicing a pulverizer having a housing, a journal assembly pivotally connected to the housing, a grinding mechanism operatively connected to the journal assembly, a journal opening within the housing adjacent to the journal assembly that provides an access point to an interior of the housing, and a plurality of holes in the housing surrounding the opening, the method comprising the steps of:

mounting a hoist apparatus to the housing of the pulverizer adjacent to the journal opening in the housing, the hoist apparatus including:

a frame assembly received about the journal opening within the housing of the pulverizer, the frame assembly including a back plate with a plurality of apertures configured to receive fasteners for mounting the frame assembly to the plurality of holes in the housing of the pulverizer, formed from a pair of spaced apart, opposed leg members, and a cross member extending between the leg members to connect a top end of each of the leg members with one another to provide the frame assembly with dimensions that correspond to a size of the journal opening within the housing, a top plate extending outwardly from the cross member of the back plate away from the housing of the pulverizer, and a plurality of support plates coupled to the back plate and the top plate, each of the support plates extending between the back plate and the top plate at a downward angle between the leg members to support the top plate from below;

a sheave assembly including a plurality of sheaves supported by the frame assembly, the sheaves being mounted for rotation about respective horizontal axes;

a motor operatively connected to one of the plurality of sheaves; and a cable received by the sheave assembly;

extending the cable from a sheave of the sheave assembly in the hoist apparatus through the journal opening into the housing of the pulverizer;

connecting the cable to a component within the housing;

actuating the motor of the hoist apparatus to rotate the sheave to withdraw the cable; and rotating the component out of the housing through the opening.

7. The method according to claim 6, further comprising the step of:

removing a cover to expose the journal opening and bolt holes surrounding the journal opening; and connecting the hoist apparatus to the housing using the bolt holes surrounding the journal opening that are utilized to secure the cover over the journal opening.

8. The method according to claim 7, wherein:
the component is the journal assembly.

9. The method of claim 8, wherein:
the plurality of sheaves are located such that a center of gravity of the journal assembly is approximately 0 inch to 6 inches outside of a pivot point of the journal assembly when the journal assembly is rotated out of the journal opening and the cable is at its shortest length.

10. The method according to claim 7, wherein:
the component is the grinding mechanism.

11. The method according to claim 6, wherein:
the pulverizer further includes a turret; and
wherein when mounted to the housing, the hoist apparatus is located substantially below a plane defined by a top surface of the turret.

12. The method of claim 1, wherein:
the hoist apparatus weighs between about 1,000 pounds and 30,000 pounds.

* * * * *